United States Patent [19]

Sprague et al.

[11] 3,830,467

[45] Aug. 20, 1974

[54] TOOL FOR ADJUSTABLY REPOSITIONING A CAMBER/CASTER ADJUSTING BAR

[76] Inventors: Hallie W. Sprague, P.O. Box 10364, Fort Worth, Tex. 76114; James R. Sprague, 105 E. 6th, Weatherford, Tex. 76068

[22] Filed: Aug. 27, 1973

[21] Appl. No.: 391,641

[52] U.S. Cl. .................................. 254/1, 81/3 R
[51] Int. Cl. .......................... B66f 3/00, B27b 27/00
[58] Field of Search .............. 81/3 R; 254/1; 29/267

[56] References Cited
UNITED STATES PATENTS
3,537,685  11/1970  Gregory .............................. 254/131
3,618,674  11/1971  Woodworth et al. ................ 254/131

Primary Examiner—Al Lawrence Smith
Assistant Examiner—Roscoe V. Parker
Attorney, Agent, or Firm—Huebner & Worrel

[57] ABSTRACT

A hand tool for adjustably repositioning a camber/caster adjusting bar for the steering section of selected automobiles, including an elongated drive shaft characterized by an array of flats for receiving a wrench through which torque is applied to the shaft, a protuberance extended axially from the shaft to be received within a support opening provided adjacent to a camber/caster adjusting bar, an eccentric cam rigidly affixed to the drive shaft and circumscribed by a ring follower having a radially extended hook for receiving therein an adjusting bar. Rotation of the drive shaft imparts lateral motion to the follower, whereupon the hook responsively repositions the camber/caster adjusting bar.

5 Claims, 6 Drawing Figures

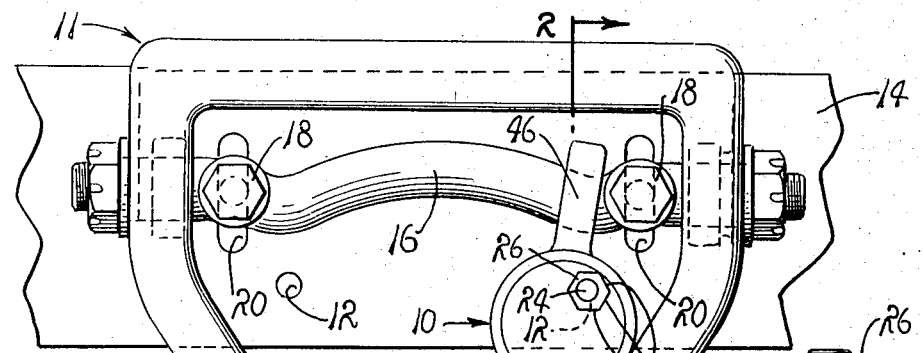
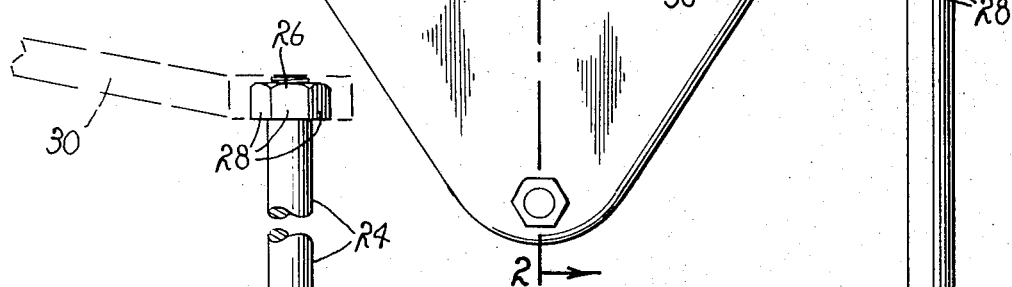
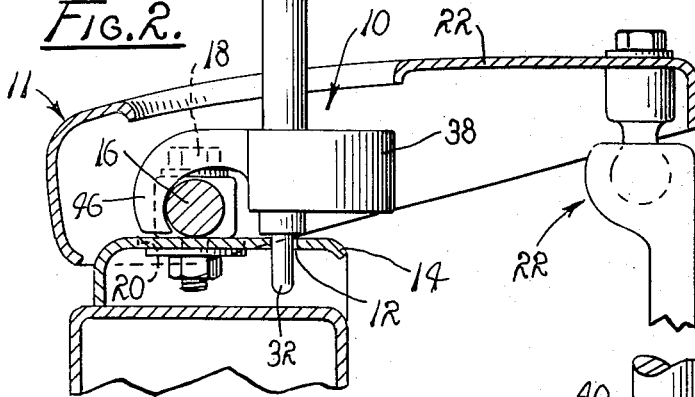
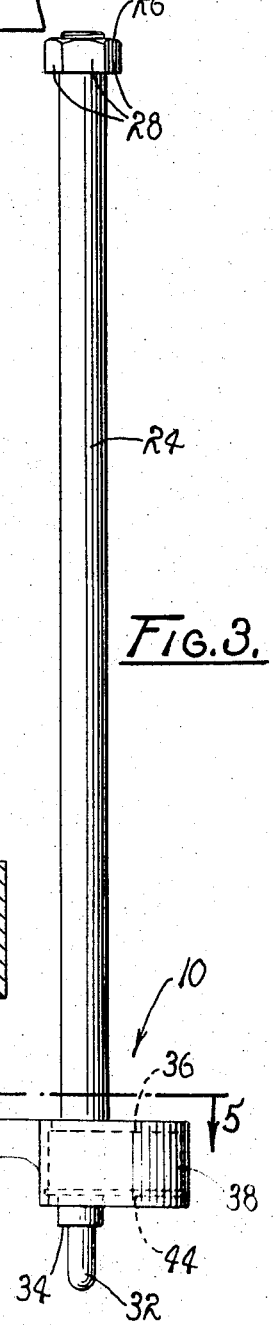
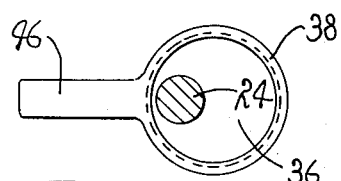
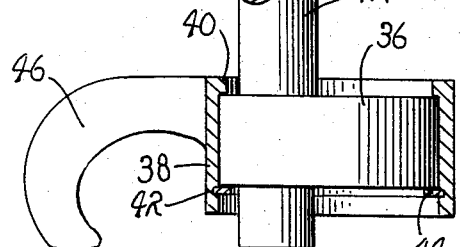
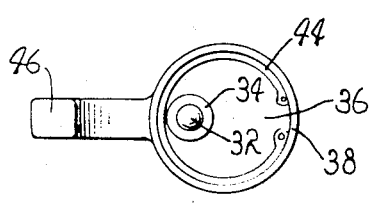

TOOL FOR ADJUSTABLY REPOSITIONING A CAMBER/CASTER ADJUSTING BAR

BACKGROUND OF THE INVENTION

The invention relates to hand tools for use in adjusting the camber/caster of automobile wheels, and more particularly to a hand-operated tool for use in selectively repositioning a camber/caster adjusting bar for the front wheels of automobiles, particularly those manufactured by the Ford Motor Company.

As is fully understood by those familiar with steering systems for various automobiles heretofore manufactured by the Ford Motor Company camber and caster adjustment heretofore has been achieved by first loosening tie-down bolts seated in slotted openings formed in a portion of the frame and then forcibly repositioning the camber/caster adjusting bar. Such repositioning of the adjustment bar frequently requires that a screwdriver, or a tool of a similar nature, be anchored in the slot and motion then imparted to the adjusting bar through a prying action. Moreover, attempts have been made to provide tools adapted to seat in openings adjacent the adjusting bar and manipulated for laterally displacing the adjustment bar. However, as can also be fully appreciated by those familiar with such tools, it frequently is virtually impossible to employ the tools heretofore available because of the current practice of mounting numerous lines and auxiliary structures in the vicinity of the adjusting bar.

It is, therefore, the general purpose of the instant invention to overcome the aforementioned difficulties by providing a simple, economic, and practical hand tool which can readily be inserted within openings provided in the frame of automobiles, adjacent camber/caster adjusting bars and employed for shifting the bar relative to the main frame for thereby facilitating a rapid and economic adjustment of camber and caster for the steering systems of selected automobiles.

OBJECTS AND SUMMARY OF THE INVENTION

It is therefore an object of the instant invention to provide an improved hand tool for adjustably repositioning movable members.

It is another object to provide an improved hand tool for adjustably repositioning the camber/caster adjusting bars.

It is another object to provide a hand tool including a shaft, an eccentric cam mounted on the shaft and confining ring follower having a radially extended hook for engaging a camber/caster adjusting bar, and a protuberance adapted to seat within an opening formed in the frame of a selected automobile.

These and other objects and advantages are achieved through a hand tool including a drive shaft, a bearing protuberance extended axially from the drive shaft and adapted to be received within a supporting opening formed in the frame of a selected automobile, an eccentric cam rigidly mounted on the drive shaft, a ring follower circumscribing the cam and disposed in confining engagement therewith, and a radially extended hook rigidly fixed to the cam follower and adapted to be attached to the adjustment bar for imparting a shifting motion thereto, as the drive shaft is rotated for imparting rotary motion to the cam, as will hereinafter become more readily apparent by reference to the following drawings and description in light of the accompanying claims.

BRIEF DESCRIPTION OF THE DRAWINGS

FIG. 1 is a top plan view of a hand tool which embodies the principles of the instant invention depicting a coupled relation of the tool with a camber/caster adjusting bar.

FIG. 2 is a fragmented, cross-sectional view, taken generally along line 2—2 of FIG. 1.

FIG. 3 is a side elevation of the tool shown in FIGS. 1 and 2.

FIG. 4 is a fragmented, partially sectioned elevation of the tool.

FIG. 5 is a cross-sectional view, taken generally along line 5—5 of FIG. 3.

FIG. 6 is the bottom plan view of the tool shown in FIG. 3.

DESCRIPTION OF THE PREFERRED EMBODIMENT

Referring now to the drawings wherein like reference characters designate like or corresponding parts throughout the several views, there is shown in FIG. 1 a hand tool, generally designated 10, which embodies the principles of the instant invention.

In order to more fully appreciate the instant invention, attention is invited to the assembly, generally designated 11, illustrated in FIG. 1. As shown in FIG. 1, openings 12 are provided in a frame 14 of a selected automobile, in close proximity with a camber/caster adjusting bar 16. It is in one of these openings that the tool 10 is seated, as shown. Since camber/caster adjustment bars form no part of the instant invention, a detailed description of the bar 16 is omitted in the interest of brevity. However, it is to be understood that the adjusting bar 16, as shown, is secured to the frame 14 by a pair of tie-down bolts 18 extended through slots 20, also formed in the frame. Selected motion imparted to the adjusting bar 16, in lateral directions paralleling the longitudinal axes of the openings 12, serves to vary the camber and/or caster of a wheel connected therewith, through conventional linkage, generally designated 22. Once the adjusting bar 16 is selectively repositioned within the slots 20, the tie-down bolts 18 are tightened for securing the adjusting bar in place relative to the frame 14. Since this technique and its purpose are well understood by those familiar with the art of adjusting the camber and caster of "front wheels," a detailed description thereof is omitted in the interest of brevity.

Moreover, it is to be understood that while the tool 10 has particular utility in repositioning camber/caster adjusting bars, the tool can be employed in any environment wherein space is limited and lateral motion is to be imparted to selected members in planes angularly related to the longitudinal axis of the tool.

Referring now more particularly to FIG. 3, it can be appreciated that the tool 10 includes an elongated drive shaft 24 having affixed at one end thereof a nut 26 including a plurality of flats 28. The nut 26 serves to receive a wrench 30, illustrated in FIG. 2, through which torque is applied to the drive shaft. Of course, the flats 28 may be machined or otherwise provided on the surface of the drive shaft 24 at any selected location.

At the end of the drive shaft 24 opposite the nut 26, there is extended in coaxial relation with the drive shaft a protuberance 32. This protuberance is configured to be received by either of the openings 12 and is formed by machining the end of the shaft 24 to a reduced diameter and terminates in a shoulder 34. The shoulder engages the surface of the frame 14 and, in operation, serves as a bearing surface. Thus, it can be appreciated that the drive shaft 24 readily is received and supported within either of the openings 12 as the shoulder 34 engages the adjacent surface of the frame 14, as illustrated in FIG. 2.

Adjacent the shoulder 34, in spaced relation therewith, there is mounted an eccentric cam 36. The cam 36 is of a diskshaped configuration and is provided with an eccentric bore, not designated. Through this bore is extended the drive shaft 24. The drive shaft 24 and the cam 36 are united in any suitable manner, such as by welding along their lines of juncture.

Provided in circumscribing relation with the eccentric cam 36 is a ring follower 38. The ring follower 38 has an inside diameter substantially equal to that of the outside diameter of the cam 36 so that the cam 36 may be recieved within the cam follower with a snug fit. As a practical matter, the cam 36 and follower 38 are united through an annular lip 40 and groove 42 having a mated snap ring 44. The lip 40 is inwardly projected from the inner surface of the follower and engages the adjacent surface of the cam 36 while the annular groove 42 is provided within the follower 38, in spaced relation with the lip, and receives therewithin a snap ring 44. The snap ring 44 and the lip 40 cooperate to confine the eccentric cam 36 within the ring follower 38.

Extended radially from the outer surface of the ring follower 38 there is a hook 46 of a suitable configuration for receiving therewithin the camber/caster adjustment bar 16. In practice, the specific configuration of the hook 46 is varied in accordance with the particular configuration of the member to be received therewithin. The hook 46 and the ring follower 38 are united in any suitable manner, such as by welding and the like, so that the hook and the ring follower are integrated into a unitary member.

Thus it should be apparent that rotation imparted to the shaft 24 of the tool 10, about a fixed axis of rotation causes the cam 36 to advance along a sweeping arc about the axis. This motion, when transmitted to the hook 46, causes the hook to move in a substantially linear path, so long as the hook is restrained from rotating with the shaft. Of course, when the hook 46 is engaged with the adjusting bar 16, a sliding relationship is established between the adjacent surfaces of the follower 38 and the cam 36. Thus the hook 46 is restrained from rotating with the shaft 24.

OPERATION

It is believed that in view of the foregoing description, the operation of the device will readily be understood and it will be briefly reviewed at this point.

With the tool 10 assembled in the manner hereinbefore described, and the tie-down bolts 18 loosened, the protuberance 32 of the tool 10 is seated in a selected one of the openings 12 formed in the frame 14 of a selected automobile. The hook 46 is simultaneously engaged with the camber/caster adjusting bar 16. A wrench 30 is then affixed to the flats 28 of the nut 26 so that torque is applied to the shaft 24 as the wrench is manipulated. Torque thus applied serves to impart rotary motion to the eccentric cam 36. This motion acts on the ring follower 38 and causes it to move in a plane normal to the longitudinal axis of the shaft. Since the hook 46 is engaged with the camber/caster adjustment bar 16, rotary motion of the hook is precluded. Therefore, it can be appreciated that as the cam 36 is rotated, linear motion is imparted to the hook 46. This motion serves to thus shift the adjusting bar 16. Once the adjusting bar 16 has been suitably repositioned, the tie-down bolts 18 are tightened so that the bar 16 is secured in its adjusted position. The tool 10 is now removed simply by extracting the protuberance 32 from the openings 12 and lifting the hook 46 from engagement with the adjusting bar 16.

In view of the foregoing, it should readily be apparent that a tool of the instant invention provides a practical solution to the perplexing problem of providing for an expeditious and economic adjustment of the caster and/or camber of selected automobiles.

Although the invention has been herein shown and described in what is conceived to be the most practical and preferred embodiment, it is recognized that departures may be made therefrom within the scope of the invention, which is not to be limited to the illustrative details disclosed.

We claim:

1. A tool for adjustably repositioning an adjacent, movable member comprising:
   A. a drive shaft;
   B. a bearing means for supporting said drive shaft for angular motion about a longitudinal axis of symmetry;
   C. an eccentric cam rigidly mounted on said drive shaft;
   D. a ring follower circumscribing said cam and disposed in confining engagement therewith; and
   E. coupling means integral with said follower for coupling the follower with a selected movable member.

2. The tool of claim 1 wherein said bearing means includes an axially extended protuberance integral with said shaft adapted to be received within a supporting opening located in close proximity with said movable member.

3. The tool of claim 2 wherein said coupling means includes a rigid hook welded to said ring follower, extended radially therefrom, and configured to receive a camber/caster adjusting bar within a steering system of a selected automobile.

4. The tool of claim 3 further comprising means for imparting angular motion to said shaft including an array of flats circumscribing said drive shaft for receiving a torque-applying wrench.

5. A tool for adjustably repositioning a camber/caster adjusting bar for the steering sections of selected automobiles comprising:
   A. an elongated drive shaft characterized by an array of flats disposed at one end thereof and adapted to receive a wrench through which torque is applied to the shaft, and a protuberance extended axially from the opposite end of the shaft and adapted to be received within a support opening provided in the frame of a selected automobile in juxtaposition with a camber/caster adjusting bar;
   B. a disk cam eccentrically related to said drive shaft and rigidly affixed thereto;

C. a ring follower circumscribing said cam and disposed in sliding engagement therewith; and D. means including a rigid hook integral with said follower and radially extended therefrom adapted to receive in locking engagment the camber/caster adjusting bar whereby the adjusting bar is caused to move in to-and-fro directions as rotary motion is imparted to the drive shaft in response to torque applied thereto.

* * * * *